(12) United States Patent
Amsterdam et al.

(10) Patent No.: US 7,556,193 B1
(45) Date of Patent: Jul. 7, 2009

(54) METHOD AND APPARATUS FOR AFFINITY CARD CONSOLIDATION

(75) Inventors: Jeffrey D. Amsterdam, Marietta, GA (US); Rick A. Hamilton, II, Charlottesville, VA (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/165,353

(22) Filed: Jun. 30, 2008

(51) Int. Cl.
*G06K 5/00* (2006.01)
(52) U.S. Cl. ................................... 235/380
(58) Field of Classification Search ............... 235/380
See application file for complete search history.

(56) References Cited

U.S. PATENT DOCUMENTS

| 6,068,183 | A | 5/2000 | Freeman et al. |
| 7,111,777 | B2 | 9/2006 | Singhal |
| 7,213,749 | B2 | 5/2007 | Webb et al. |
| 7,240,843 | B2 | 7/2007 | Paul et al. |
| 7,249,112 | B2 | 7/2007 | Beradi et al. |
| 7,357,312 | B2 | 4/2008 | Gangi |
| 7,360,689 | B2 | 4/2008 | Beenau et al. |
| 2005/0144076 | A1 | 6/2005 | Cimino |
| 2006/0081702 | A1 | 4/2006 | Nandakumar |
| 2008/0097853 | A1 | 4/2008 | Kim et al. |

*Primary Examiner*—Steven S Paik
*Assistant Examiner*—Tae W Kim

(57) ABSTRACT

The disclosure relates to a universal affinity card for consolidating a plurality of other affinity cards into a single card and displays the appropriate card automatically as a function of, among others, the location of use. In one embodiment, the disclosure relates to a method for providing a universal affinity card. The method includes: providing an affinity card having a memory, a display and a user interface; storing a plurality of bar codes in the memory; associating each of the plurality of bar codes with a respective provider; identifying the provider; and displaying the bar code associated with the identified provider on the display; wherein the step of storing a plurality of bar codes in the memory includes wirelessly receiving information defining the plurality of bar codes from a remote computer.

1 Claim, 5 Drawing Sheets

METHOD AND APPARATUS FOR AFFINITY CARD CONSOLIDATION

BACKGROUND

1. Field of the Invention

The disclosure relates to a method and apparatus for consolidating a plurality of affinity cards into a single portable card. More specifically, the disclosure relates to a universal affinity card for consolidating a plurality of other affinity cards into a single card and displaying the appropriate barcode associated with the store card automatically as a function of, among others, the location of use.

2. Description of Related Art

Recent years have seen an increase in the number of store-issued affinity cards which enable customers to be recognized for special privileges. Typically, the affinity card allows its owner to receive a discount either at the checkout station or on annual basis. The affinity cards are valuable to the stores because they allow the store to track the purchasing habits of its customers. The affinity cards also enable the stores to provide promotional events and coupons aimed directly at the customer and appraised based on the customer's purchasing habits. Affinity programs are used to gain customer loyalty by making special offers to customers who shop at a particular store. On the other hand, membership cards are used to verify a person's identity upon entering the store.

The conventional affinity card is printed on laminated paper and includes a barcode containing the customer's information. Many of the barcodes come from retail or other affinity programs, club memberships, or other coded information the customer may need.

Because each store issues a different affinity and/or membership card, an average customer has a multitude of such cards. Having all such cards one's disposal at all time is inefficient and cumbersome. The number of reasons a customer may need to carry various cards is endless. However, they all share the same characteristics. Namely, the customer must carry these cards to be scanned at various locations for the card to be used and for the customer to receive the benefit of membership. Keeping up with a large number of cards and transporting these cards to various locations can become burdensome and may lead to decreased usage of the cards. Therefore, there is a need for a method and apparatus to provide a universal affinity card.

SUMMARY

In one embodiment, the disclosure relates to a method for providing a universal affinity card, the method comprising: providing an affinity card having a memory, a display and a user interface; storing a plurality of bar codes in the memory; associating each of the plurality of bar codes with a respective provider; identifying the provider; and displaying the bar code associated with the identified provider on the display; wherein the step of storing a plurality of bar codes in the memory includes wirelessly receiving information defining the plurality of bar codes from a remote computer; and wherein the step of identifying the provider includes one of receiving an identification signal from the provider or identifying the provider as a function of the provider's geolocation.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
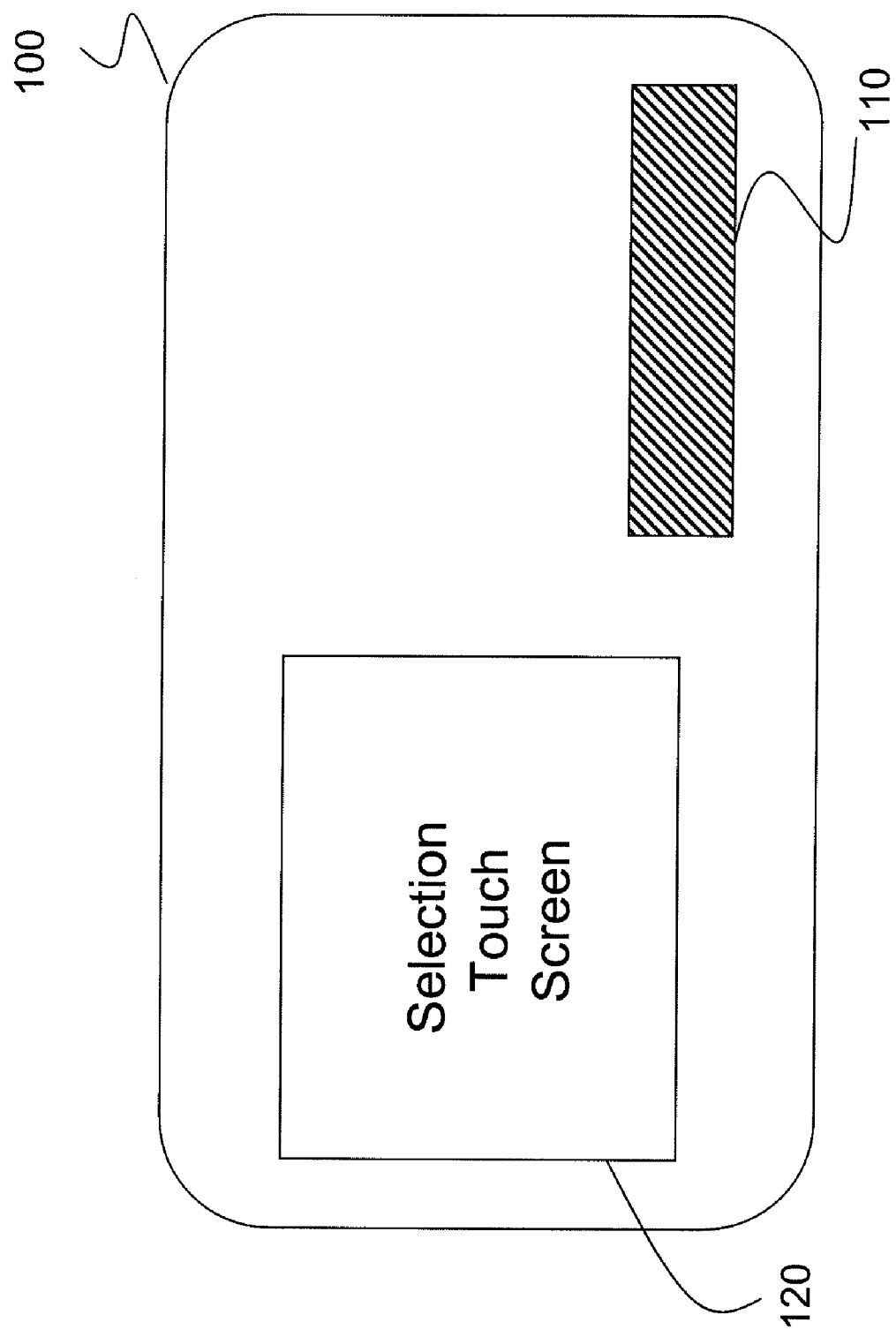
FIG. 1 is a schematic representation of the front side of a universal affinity car according to one embodiment of the disclosure.

FIG. 1 is a schematic representation of the front side of a universal affinity car according to one embodiment of the disclosure. In FIG. 1, card 100 is shown with region 110 for displaying barcode information. Barcode region 110 can comprise a graphic display such as LCD, LED or other display means. Barcode region 110 displays a barcode according to the customer's selection. The barcode can comprise a conventional one-dimensional, two-dimensional or three-dimensional bar code. The barcode displayed at region 110 can be scanned with conventional scanner to identify the customer's information.

Touch screen 120 can comprise a selection touch screen pad which can be programmed to display the stored information. The touch screen pad can provide a conventional graphic user interface for displaying store information and allowing the customer to select the desired store. Once the desired store is selected from touch screen 120, a corresponding bar code for the store can be displayed at bar code region 110.

Affinity card 100 further comprises a processor circuit (not shown), a memory circuit (not shown) and I/O bus (not shown) required to perform the functions described above. Accordingly, affinity card 100 can be connected to a computer or other programming device for uploading pertinent customer information and store barcodes into affinity card 100.

Figure 2:
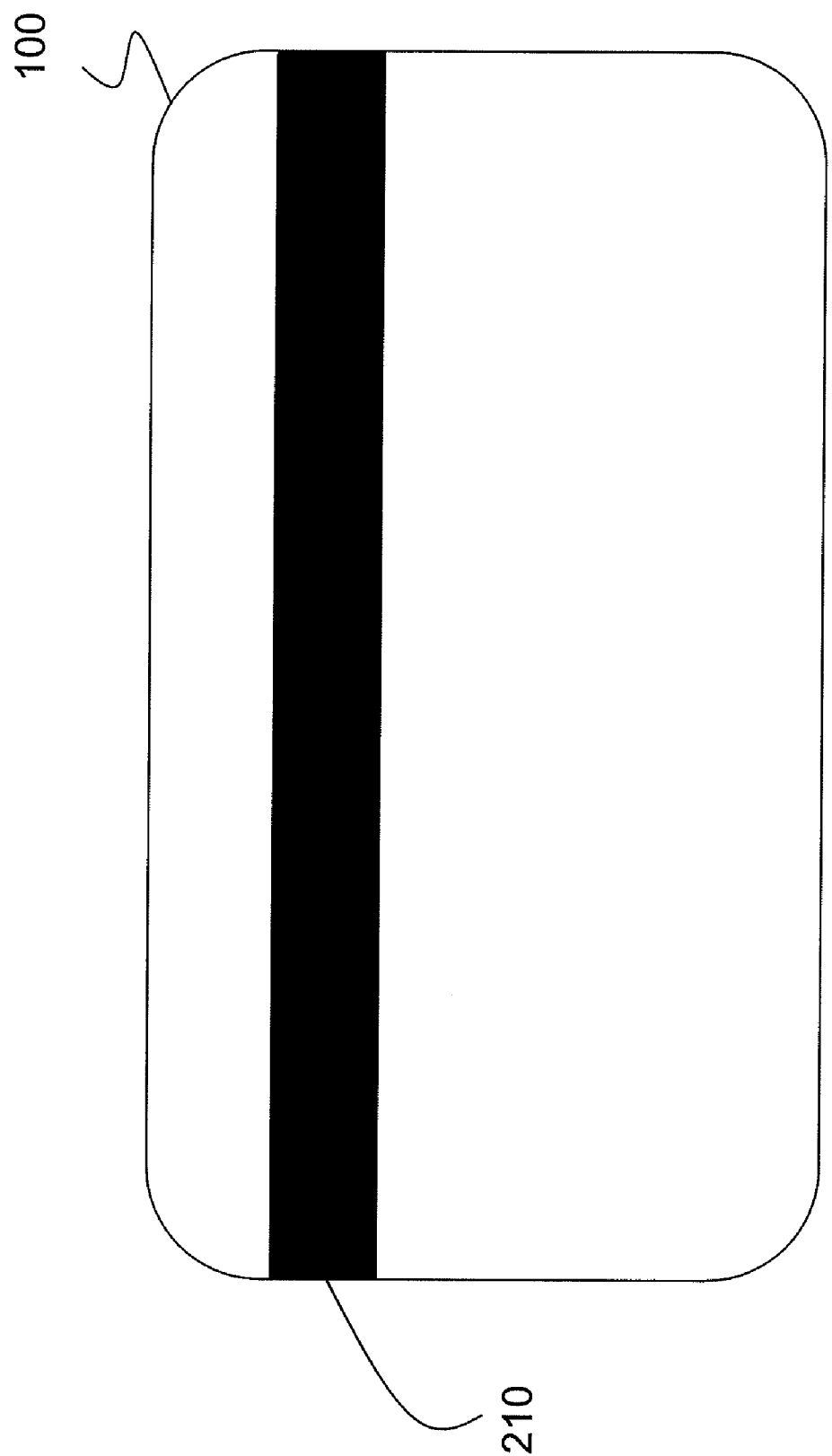
FIG. 2 schematically illustrates the backside FIG. 1.

FIG. 2 schematically illustrates the backside of card 100 shown in FIG. 1. As shown in FIG. 2, the backside of card 100 includes an optional magnetic strip 210. Magnetic strip 210 can be encoded with personal customer information or other indications of authenticity. Magnetic strip 210 can be optionally added.

Figure 3:
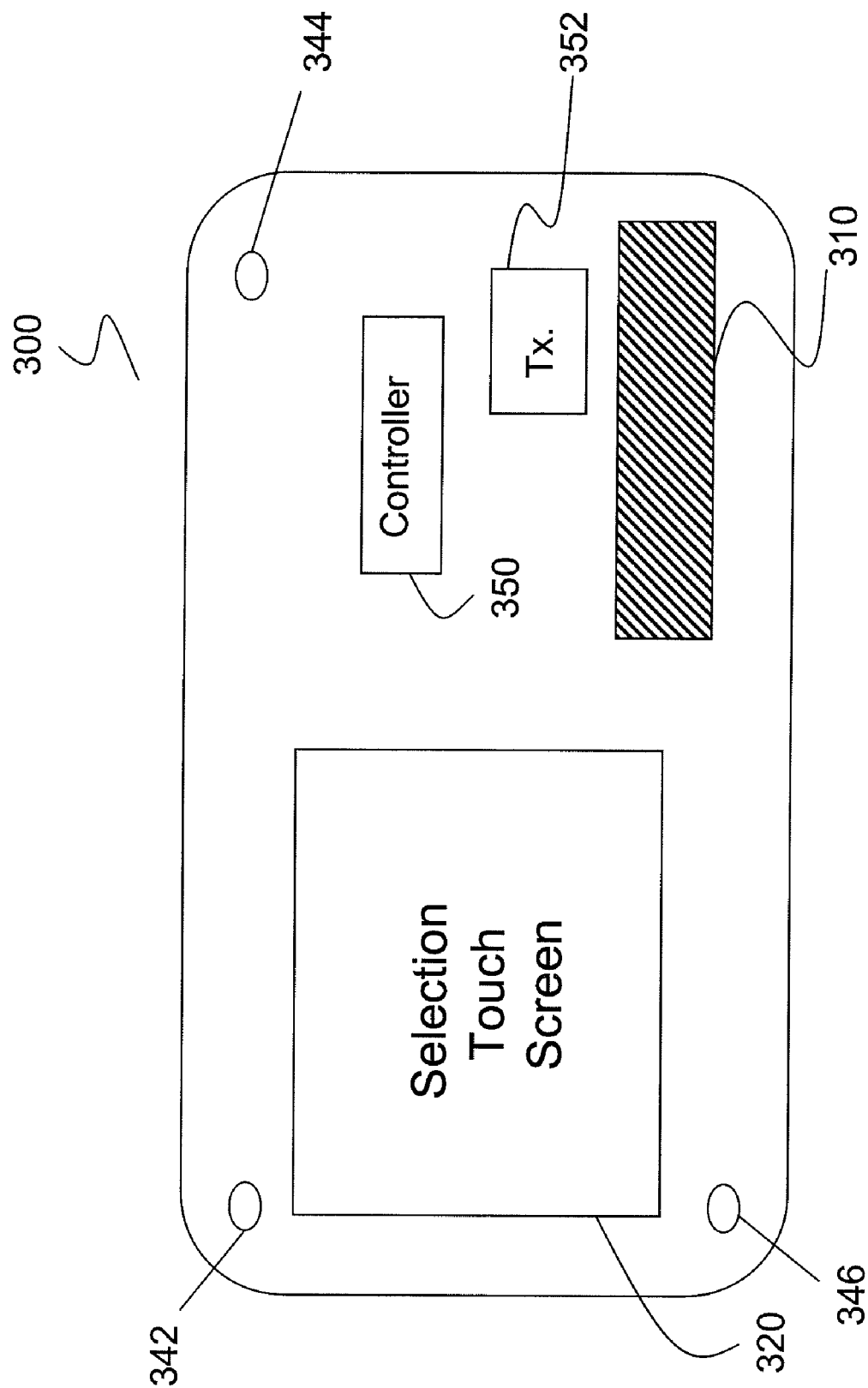
FIG. 3 illustrates an affinity card according to another embodiment of the disclosure

FIG. 3 illustrates an affinity card according to another embodiment of the disclosure. Universal affinity card 300 of FIG. 3 comprises selection touch screen 320 and barcode display 310 similar to card 100 of FIG. 1. In addition, card 300 includes controller 350 and antennas 342, 344 and 346. Controller 350 can comprise one or more electronic circuits including, a processor circuit (not shown), a memory circuit (not shown). Transceiver circuitry 352 uses antennas 342, 344 and 346 to communicate with wireless infrastructures such as communication base stations and satellites. Thus, transceiver 352 can be used to geolocate card 300 and thereby determine the store in which it is being used. Additionally, transceiver 352 can be used to program card 300 (optionally, through controller 350) with customer information or information concerning location of a particular store and the barcode associated with the location.

In one embodiment, transceiver 352 geolocates the position of card 300 by accessing wireless transmissions form nearby base stations. In another embodiment, transceiver 352 cooperates with controller 310 to geolocate card 300 using satellite geolocation techniques. Transceiver 352 can also act as a transponder by picking up store-generated signals, such as theft detection signals or other proprietary wireless signals, to determine its location. Once the location of card 300 is determined, controller 350 can use the information to display the barcode associated with the store.

For example, if the customer enters a store and carries card 300 with her, transceiver 352 can determine its location by one of the methods described above. Once the card determines its location, controller 350 can determine the name of the store associated with the current location and direct touch screen pad 320 to display the store name, log or other pertinent information. In addition, controller 350 can direct barcode display 310 to display the barcode associated with the store.

The embodiment of FIG. 3 may also be used independent of the geolocation function. As with card 100 of FIG. 1, touch screen pad 320 can display the store names, logos or other pertinent information and allow the customer to select the proper store. Once the store is selected, barcode display 310 will display the barcode corresponding to the identified store and the car can be readily used as an affinity card.

Figure 4:
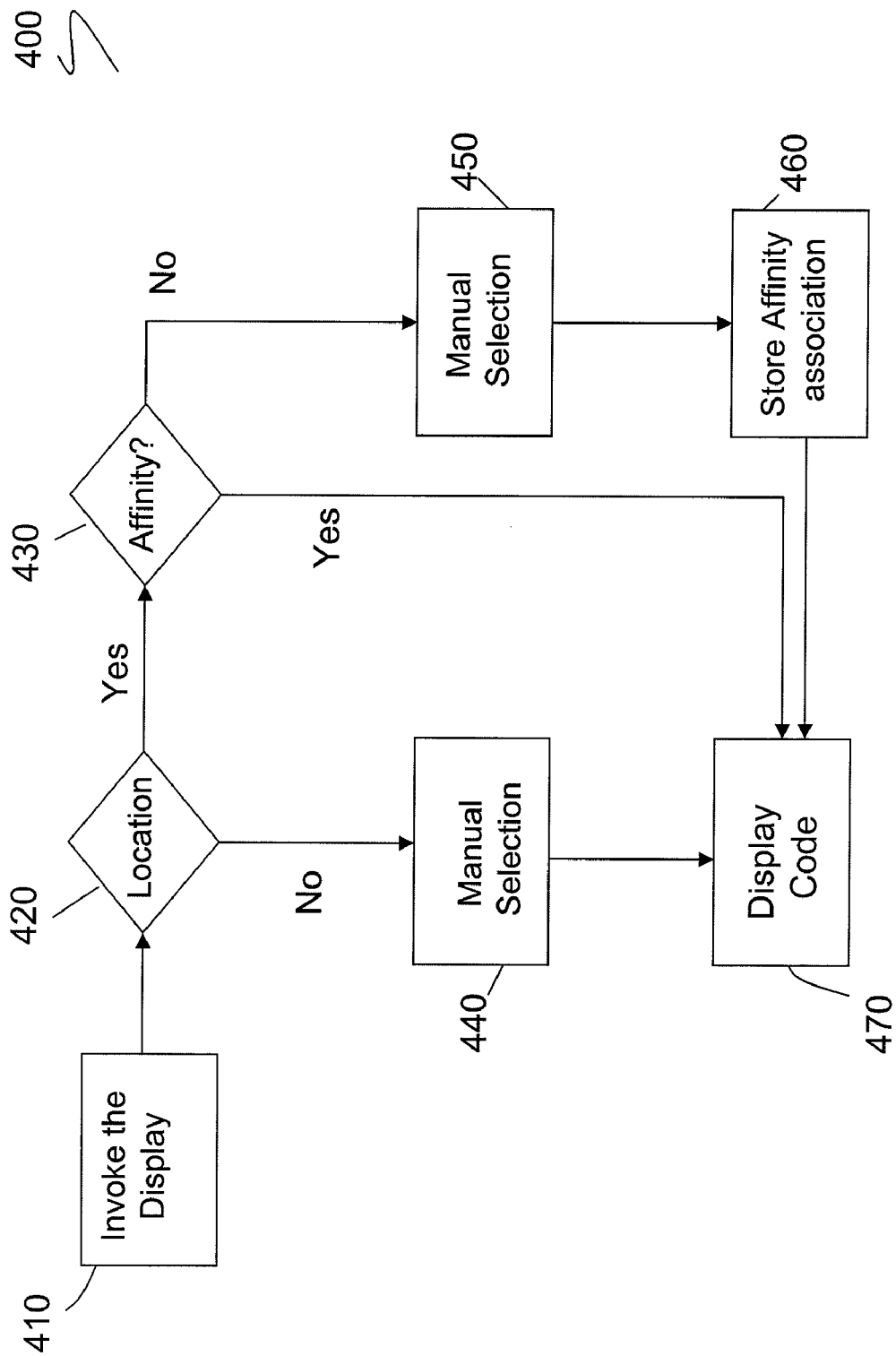
FIG. 4 is an exemplary process flow diagram for a universal affinity card according to one embodiment of the disclosure.

FIG. 4 is an exemplary process flow diagram for a universal affinity card according to one embodiment of the disclosure. Process 400 of FIG. 4 can be implemented with the card 300 of FIG. 3 or other exemplary embodiments disclosed herein. Consequently, the steps of FIG. 4 are discussed with simultaneous reference to the exemplary embodiment of FIG. 3.

In step 410, the affinity program is started by activating the card or the touch screen display 100 (FIG. 1). Step 410 may be optional. In one embodiment, the card passively scans for available signals to determine its location without being physically activated. Once activated, the universal affinity card can determine its location automatically in step 420.

If the card is able to assess its own location (e.g., through geolocation methods described above) the card can then determine whether the store at the current location is part of its affinity group as shown in step 430. Assuming that the store is part of the card's affinity group, at step 470 the affinity card can display the store's barcode on the barcode display. If the store is not part of the affinity group stored on the card, at step 450, the customer is given the option of manually selecting the store from a list displayed on the selection touch pad (320, FIG. 3). At step 460, the customer manually selects the store affinity association through touch screen pad (320, FIG. 3) and, at step 470 the barcodes associated with the store is displayed.

If at step 420, the store location is not readily detected through wireless geolocation, then at step 440, the customer is given the option of manually selecting the store from a list displayed in the selection touch pad (320, FIG. 3). Thereafter, the appropriate code can be displayed on display 470.

Figure 5:
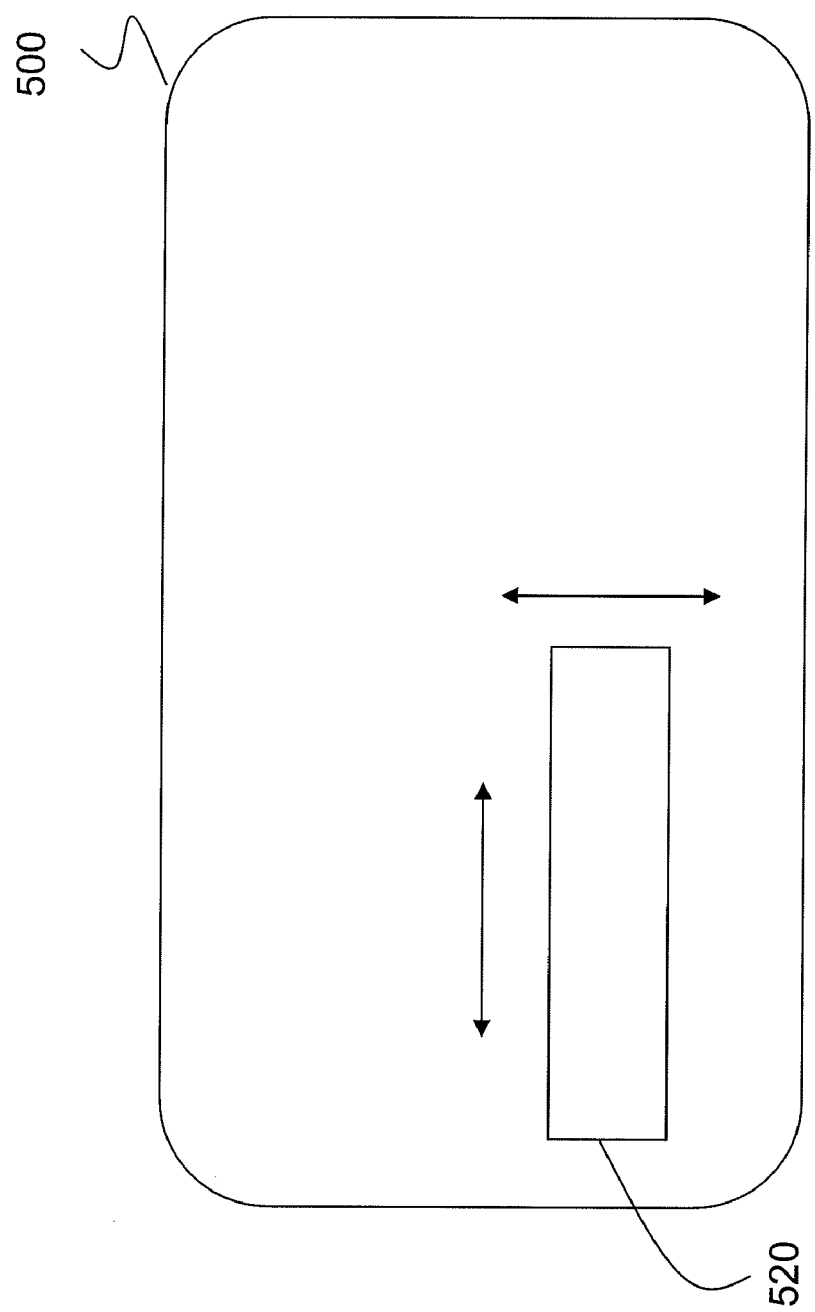
FIG. 5 is a universal affinity card having a manual selection apparatus.

FIG. 5 is a universal affinity card having a manual selection apparatus. In a non-digital embodiment of affinity card 500, a computer program may print each affinity barcode and a corresponding store identifier (name and/or logo) on a substrate in a reduced size. The substrate can be paper, cardboard, fabric or a combination thereof. The substrate can be inserted into card 500 having a movable magnification window 520. Magnification window 520 can be configured to move horizontally and vertically as shown. Magnification window 520 can magnify the limited portion of card 500 containing the desired store barcode. In one embodiment, the movable magnifier is attached to a flexible opaque strap that wraps around the apparatus, moving with the magnifier window and obscuring other affinity barcodes not being magnified.

While the principles of the disclosure have been illustrated in relation to the exemplary embodiments shown herein, the principles of the disclosure are not limited thereto and include any modification, variation or permutation thereof.

What is claimed is:

1. A method for providing a universal affinity card, the method comprising:
   providing an affinity card having a memory, a display, a magnetic stripe including at least customer personal information, and a user interface;
   wirelessly receiving, from a computer remote to the affinity card, a plurality of barcodes;
   storing the plurality of bar codes in the memory;
   associating each of the plurality of bar codes with a respective provider;
   upon entering a specified location, determining a current location of the affinity card via a transceiver of the card;
   identifying the provider associated with the current location;
   displaying the bar code associated with the identified provider on the display; and
   scanning the barcode from the display.

* * * * *